I. L. BENNET.
WHIFFLETREE.
APPLICATION FILED APR. 8, 1912.
1,053,773. Patented Feb. 18, 1913.
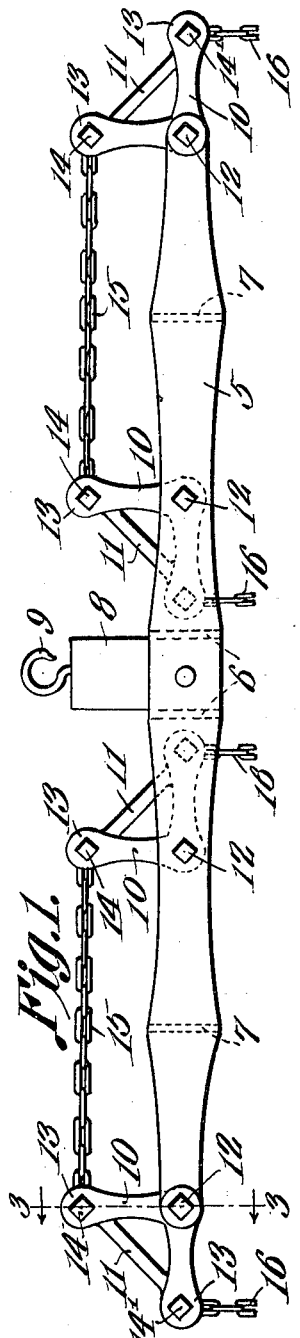
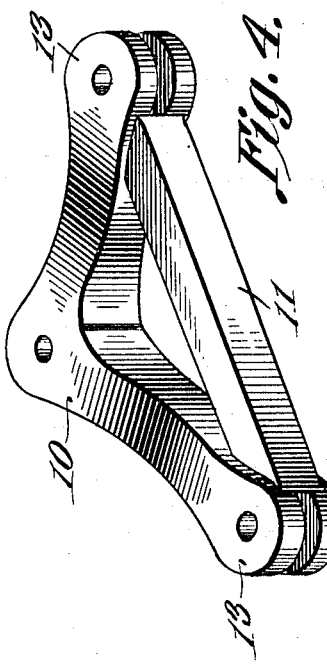
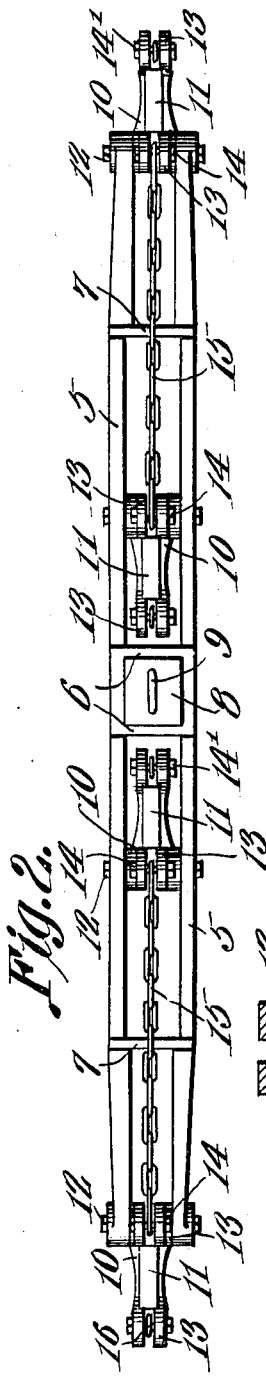
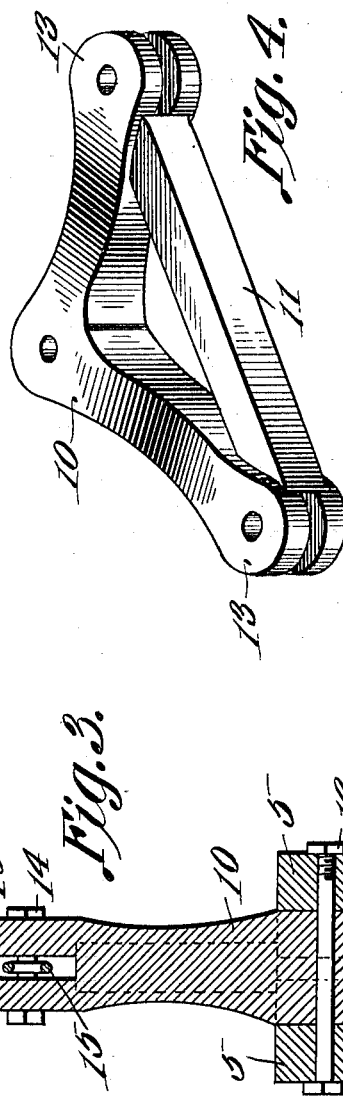
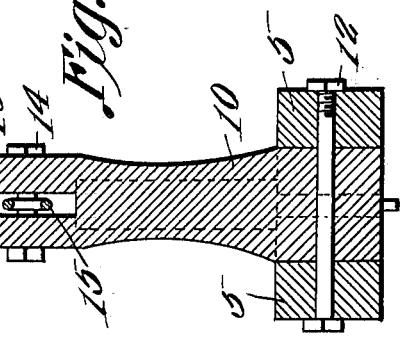
Witnesses
I. L. Bennet,
Inventor
by C. A. Snow & Co.
Attorneys

UNITED STATES PATENT OFFICE.

ISAAC L. BENNET, OF JACKSONVILLE, NEW YORK.

WHIFFLETREE.

1,053,773.  Specification of Letters Patent.  Patented Feb. 18, 1913.

Application filed April 8, 1912. Serial No. 689,411.

*To all whom it may concern:*

Be it known that I, ISAAC L. BENNET, a citizen of the United States, residing at Jacksonville, in the county of Tompkins and State of New York, have invented a new and useful Whiffletree, of which the following is a specification.

This invention relates to whiffle-trees, and has for its object the production of an improved whiffle-tree embodying novel means for the attachment of the tugs or traces so that the tugs or traces may remain taut when the pull exerted by the draft animals deviates slightly to one side or the other and whereby the traces or tugs arranged inwardly or toward the side of which the draft animals are turned may be slackened so as to apply greater force to the arm of the whiffletree away from the direction to which the draft animals are turned.

This invention also contemplates a whiffle-tree adapted for the attachment of a pair of horses or other draft animals, and which may be attached to a vehicle or a wheel-mounted or other soil-tilling implement not embodying a tongue, so that a vehicle or the like may be readily steered or turned.

This invention for another object aims to provide a simple, substantial and inexpensive whiffle-tree of this character, and which shall be convenient and efficient in use.

With the foregoing and other objects in view, which will be apparent as the invention is better understood, this invention resides in the novel construction and combination of parts hereinafter set forth and particularly pointed out in the appended claims, reference being had to the accompanying drawings wherein the invention is illustrated, and wherein—

Figure 1 is a plan view of the whiffle-tree constructed in accordance with the present invention. Fig. 2 is a rear elevation thereof. Fig. 3 is an enlarged sectional detail taken on the line 3—3 of Fig. 1. Fig. 4 is an enlarged perspective of one of the bell cranks employed in connection with the whiffle-tree.

Referring in detail to the drawings, wherein similar reference characters have been employed to denote corresponding parts, the whiffle-tree embodies a pair of spaced longitudinal sections 5, which are connected at their centers with a pair of spaced webs 6 and intermediate their centers and ends with the webs 7, the whiffle-tree being of a skeleton form. The sections 5 of the whiffle-tree are bowed slightly away from each other in order that the ends thereof converge toward each other, and the edges of the said sections converge from their central portions toward the ends thereof, the sections 5 being slightly widened at the points of attachment of the webs. This skeleton whiffle-tree may be constructed of any suitable material, and is preferably cast integral from metal of suitable character, and is substantial in construction.

A clevis 8 is attached to the whiffle-tree between the webs 6, and the said clevis has a hook 9 swiveled in the outer end thereof in order to attach the whiffle-tree to the vehicle, tilling device, or the like.

A pair of bell cranks 10 are fulcrumed to each arm of the whiffle-tree between the longitudinal section 5 thereof by means of bolts or rivets 12, the outer bell crank being fulcrumed between the ends of the sections 5 and the inner bell crank being fulcrumed between the sections 5 adjacent the corresponding web 6, or between the corresponding webs 6 and web 7. The respective arms of the bell cranks 10 project laterally to one side, or rearwardly, and longitudinally in opposite directions. The arms of each bell crank are connected by a diagonal brace 11, these bell cranks being preferably cast from metal with the braces 11 integral therewith, and the outer or free ends of the arms of the bell crank are bifurcated or forked as designated by the numeral 13. The lateral arms of each pair of bell cranks are connected by a cable, chain or the like 15, the said cable being engaged in the bifurcated ends 13 of the lateral arms by means of bolts or other securing members 14 passed therethrough. The other or longitudinal arms of the respective pairs of bell cranks are designed for the attachment of the tugs or traces 16 by means of bolts or other securing members 14 passed through the bifurcated ends 13 of the longitudinal arms.

In use, the whiffle-tree may be readily attached to the vehicle or the like by means of the hook 9, and when the traces or tugs are attached to the longitudinal arms of the respective pairs of bell cranks, the vehicle may be readily drawn forward, and the bell cranks permit the horses or other draft animals to deviate slightly in their course without slacking the tugs or traces on one side or the other. When the horses are turned sufficiently to one side or the other in order to steer the vehicle, it will be noted that the bell cranks will swing and the chains 15 will strike the webs 7 so that the respective tug of each pair away from the direction in which the horses are turned will be drawn taut while the other tug or trace will be slightly slackened, thus causing a greater draft on the arm of the whiffle-tree away from the side to which the vehicle is turned. This is of advantage for the reason that the vehicle may be readily steered, it being noted that when the horses are turned to one side or the other, a draft will be exerted on the respective bell crank of each pair away from the direction to which the vehicle is turned so that a greater leverage is provided for the arm away from the side to which the vehicle is turned. It will be seen that when each pair of the bell cranks are turned by the draft of the tugs or traces, the cables or chains 15 attached to the respective bell cranks will swing toward the webs 7, and when the bell cranks are swung sufficiently, the cables or chains 15 will strike the webs 7 thus slackening the tugs toward the side to which the horses are turned. This result is accomplished for the reason, that when the horses or draft animals are turned sufficiently to one side, the respective bell cranks of the two pairs away from the direction toward which the horses are turned are swung in the direction in which the vehicle is being turned, a portion of the draft being transmitted to the chains 15, so that the other bell cranks are also swung. Thus, when the bell cranks are swung sufficiently, the chains 15 will strike the webs 7, and a further pull or strain on the first mentioned bell cranks cannot turn the other bell cranks further, so that the tugs or traces arranged in the direction toward which the vehicle is being turned, are slackened. In the foregoing manner, the objects aimed at are attained in an efficient manner, the skeleton whiffle-tree being substantial in structure, as well as the bell cranks which are braced in the manner described.

It is understood that this device is susceptible of alterations or deviations in its details, such as changes in materials, sizes, proportions and the like, within the scope of the appended claims without departing from the spirit of the invention.

Having described the invention, what is claimed as new is:—

1. In combination with a whiffletree embodying spaced longitudinal sections, a pair of bell cranks fulcrumed between the sections with the arms projecting laterally to one side and longitudinally in opposite directions, a web connecting said sections between the bell cranks, and a cable connecting the lateral arms of the bell cranks and arranged to strike the said web when the bell cranks are swung sufficiently, the other arms being designed for the attachment of tugs.

2. In combination with a skeleton whiffle-tree embodying spaced longitudinal sections connected at points intermediate the center and ends by webs, a pair of bell cranks fulcrumed to each arm of the whiffletree between the longitudinal sections with the arms projecting laterally to one side and longitudinally in opposite directions, and cables connecting the lateral arms of each pair of bell cranks and arranged to strike the webs when the bell cranks are swung sufficiently, the longitudinal arms being designed for the attachment of tugs.

3. In combination with a skeleton whiffle-tree embodying spaced longitudinal sections connected at the center and at points intermediate the center and ends by webs, a clevis attached between the said sections and between the central webs, a pair of bell cranks fulcrumed to each arm of the whiffletree between the longitudinal sections with the arms projecting laterally to one side and longitudinally in opposite directions, cables connecting the lateral arms of each pair of bell cranks and arranged to strike the webs when the bell cranks are swung sufficiently, the longitudinal arms being designed for the attachment of tugs.

In testimony that I claim the foregoing as my own, I have hereto affixed my signature in the presence of two witnesses.

ISAAC L. BENNET.

Witnesses:
EDWARD A. GRAY,
FRED D. RAPPLEYE.

---

Copies of this patent may be obtained for five cents each, by addressing the "Commissioner of Patents, Washington, D. C."